(12) United States Patent
Kirchhoff

(10) Patent No.: US 6,641,190 B2
(45) Date of Patent: Nov. 4, 2003

(54) METHOD AND APPARATUS FOR PROVIDING A WORK STATION AT A TAILGATE OF A TRUCK

(76) Inventor: Michael R. Kirchhoff, 104 Sherrie Ave., Box 873, Kincaid, IL (US) 62540

( * ) Notice: Subject to any disclaimer, the term of this patent is extended or adjusted under 35 U.S.C. 154(b) by 0 days.

(21) Appl. No.: 09/986,233

(22) Filed: Oct. 22, 2001

(65) Prior Publication Data

US 2003/0075943 A1 Apr. 24, 2003

(51) Int. Cl.[7] ............................................. B62D 33/03
(52) U.S. Cl. ........................... 296/26.11; 296/26.08; 296/37.6; 296/57.1
(58) Field of Search ............... 296/26.08, 26.11, 296/37.6, 51, 57.1, 61; 108/44

(56) References Cited

U.S. PATENT DOCUMENTS

| | | | |
|---|---|---|---|
| 5,051,047 A | 9/1991 | Loncaric | |
| 5,169,202 A * | 12/1992 | Cupp et al. | 296/57.1 |
| 5,215,346 A * | 6/1993 | Reitzloff et al. | 296/37.6 |
| 5,518,158 A * | 5/1996 | Matlack | 296/37.6 |
| 5,575,521 A * | 11/1996 | Speis | 108/44 |
| 5,649,731 A * | 7/1997 | Tognetti | 296/57.1 |
| 5,649,734 A * | 7/1997 | Speis | 108/44 |
| 5,741,038 A | 4/1998 | Fowler et al. | |
| 5,823,595 A * | 10/1998 | Tronco | 296/26.03 |
| 5,826,932 A | 10/1998 | DeSimone | |
| 5,918,925 A * | 7/1999 | Perrin | 296/26.11 |
| 5,924,753 A | 7/1999 | DiBassie | |
| 6,045,172 A * | 4/2000 | Thomas et al. | 108/44 |
| 6,070,775 A | 6/2000 | Tolley et al. | |
| 6,193,294 B1 * | 2/2001 | Disner et al. | 108/44 |
| 6,199,930 B1 * | 3/2001 | Riley | 296/37.6 |
| 6,206,445 B1 * | 3/2001 | Brooks | 296/51 |
| 6,227,594 B1 * | 5/2001 | Pommeret | 296/57.1 |
| 6,250,702 B1 * | 6/2001 | Eipper | 108/44 |
| 6,364,391 B1 * | 4/2002 | Everett | 296/51 |
| 6,378,927 B1 * | 4/2002 | Parry-Jones et al. | 296/61 |

* cited by examiner

*Primary Examiner*—D. Glenn Dayoan
*Assistant Examiner*—Lori L Coletta
(74) *Attorney, Agent, or Firm*—Thompson Coburn, LLP

(57) ABSTRACT

A work station for use with a tailgate of a truck is provided. The work station includes a first part that is adapted to be mounted to the tailgate of a truck. The work station includes a second part that is hingedly connected to the first part to pivot between an open and closed position. In the closed position, the second part generally overlies the tailgate. In the open position, the second part extends generally rearwardly from the tailgate.

19 Claims, 5 Drawing Sheets

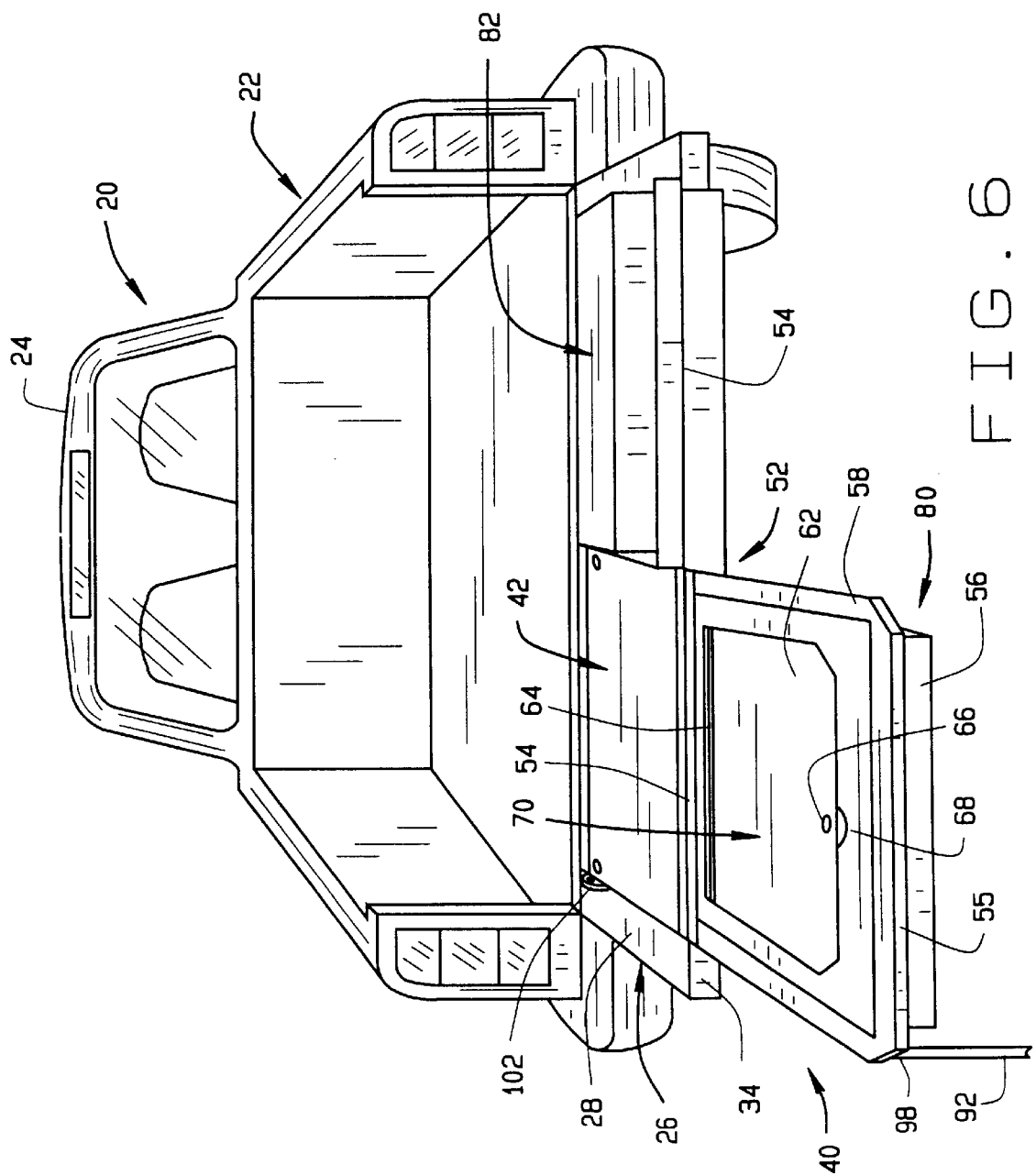

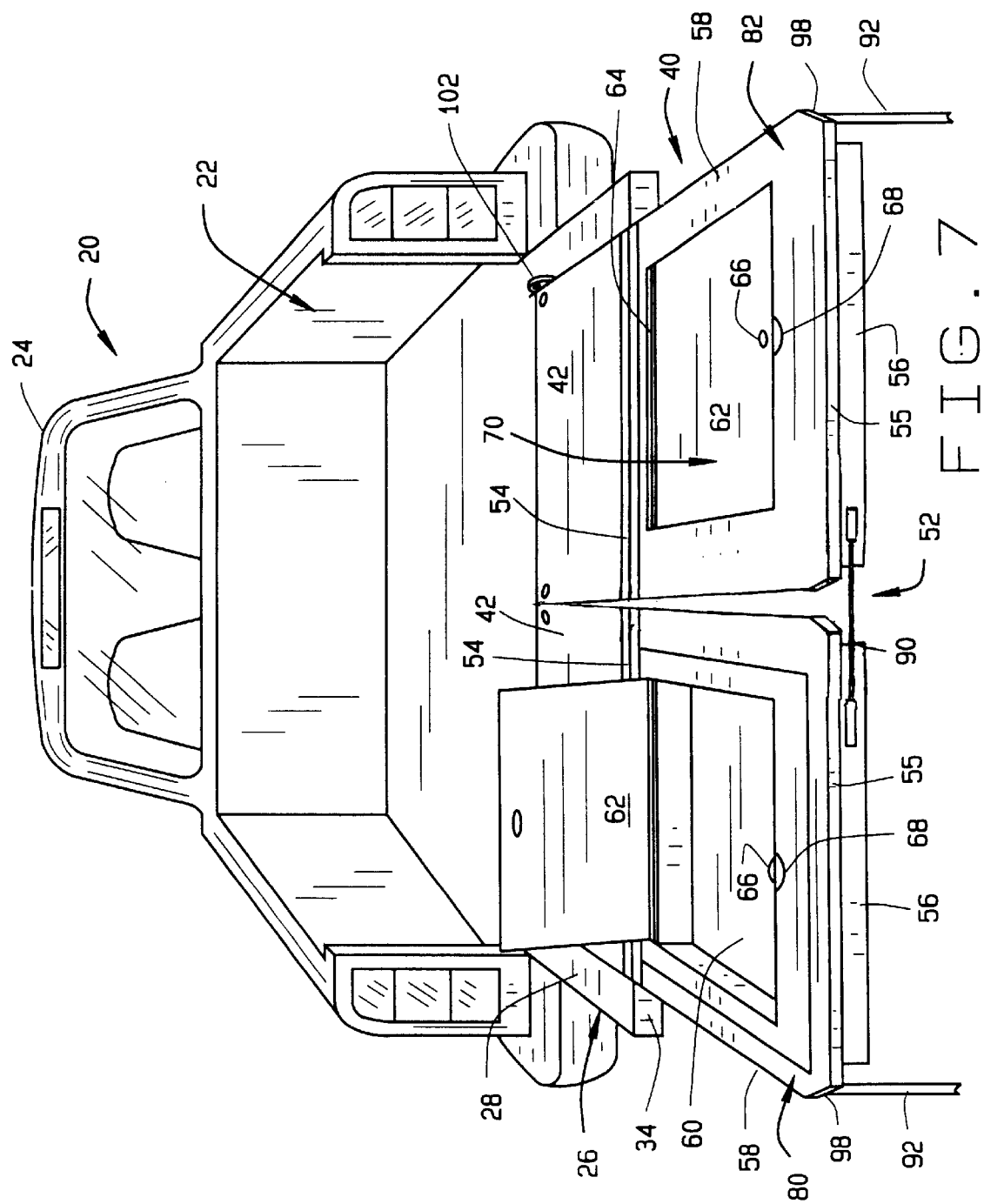

ately be understood that the position of the workstation 40 relative to the truck bed 22 may be changed so that a majority of the workstation is positioned on the exterior outer surface 30 of the tailgate 26. Preferably, the workstation first part 42 defines a tailgate-receiving channel 44 sized and shaped for receiving the tailgate 26. Preferably, the first part 42 is securely mounted to the tailgate 26 via suitable fasteners, such as screws or

---

METHOD AND APPARATUS FOR PROVIDING A WORK STATION AT A TAILGATE OF A TRUCK

BACKGROUND OF THE INVENTION

The present invention pertains to a method and apparatus for providing a workstation at a tailgate of a truck.

A conventional pick-up truck with an open bed has proven useful to construction and other trade personnel for transporting supplies, materials, and equipment to and from job sites. Some people have used the truck's tailgate as a workbench at a job site. However, the tailgate is often too small to act as a suitable workbench.

SUMMARY OF THE INVENTION

One aspect of the present invention comprises a workstation for use with a tailgate of a truck The tailgate is pivotable between a generally closed position and an open position where the tailgate is generally upright when in its closed position and extends generally rearwardly when in its open position. The tailgate has an inner surface where the inner surface faces generally upwardly when the tailgate is in its open position. The workstation comprises a first part adapted to be mounted to the tailgate of the truck and a second part being hingedly connected to the first part to pivot between an open position and a closed position. The second part generally overlies the tailgate when the second part is in its closed position and the first part is mounted to the tailgate. The second part extends generally rearwardly from the tailgate when the second part and tailgate are in their respective open positions and the first part is mounted to the tailgate.

Another aspect of the present invention comprises a method. A truck comprising a tailgate is provided wherein the truck tailgate is pivotable between a generally closed position and an open position. The tailgate is generally upright when in its closed position and extends generally rearwardly when in its open position. The tailgate has an inner surface that faces generally upwardly when the tailgate is in its open position. A workstation is provided comprising a first part that is adapted to be mounted to the tailgate of a truck and a second part that is hingedly connected to the first part to pivot between an open and closed position. The second part generally overlies the tailgate when the second part is in its closed position and the first part is mounted to the tailgate. The second part extends generally rearwardly from the tailgate when the second part and tailgate are in their respective open positions and the first part is mounted to the tailgate. The method further comprises attaching the workstation to the tailgate of the truck and pivoting the tailgate to its open position. The method further comprises pivoting the workstation second part to the open position and placing a work project on a work surface of the workstation.

Other objects and features of the present invention will be in part apparent and in part pointed out hereinafter.

BRIEF DESCRIPTION OF THE DRAWINGS

FIG. 6 is a rear perspective view of the pick-up truck of FIG. 1 with a section of the work station in its open position; and FIG. 7 is a rear perspective view of the pick-up truck of FIG. 1 with the workstation in its open position and a recess of the workstation exposed.

Corresponding reference characters indicate corresponding parts throughout the several views of the drawings.

DETAILED DESCRIPTION OF THE PREFERRED EMBODIMENT

Figure 1:
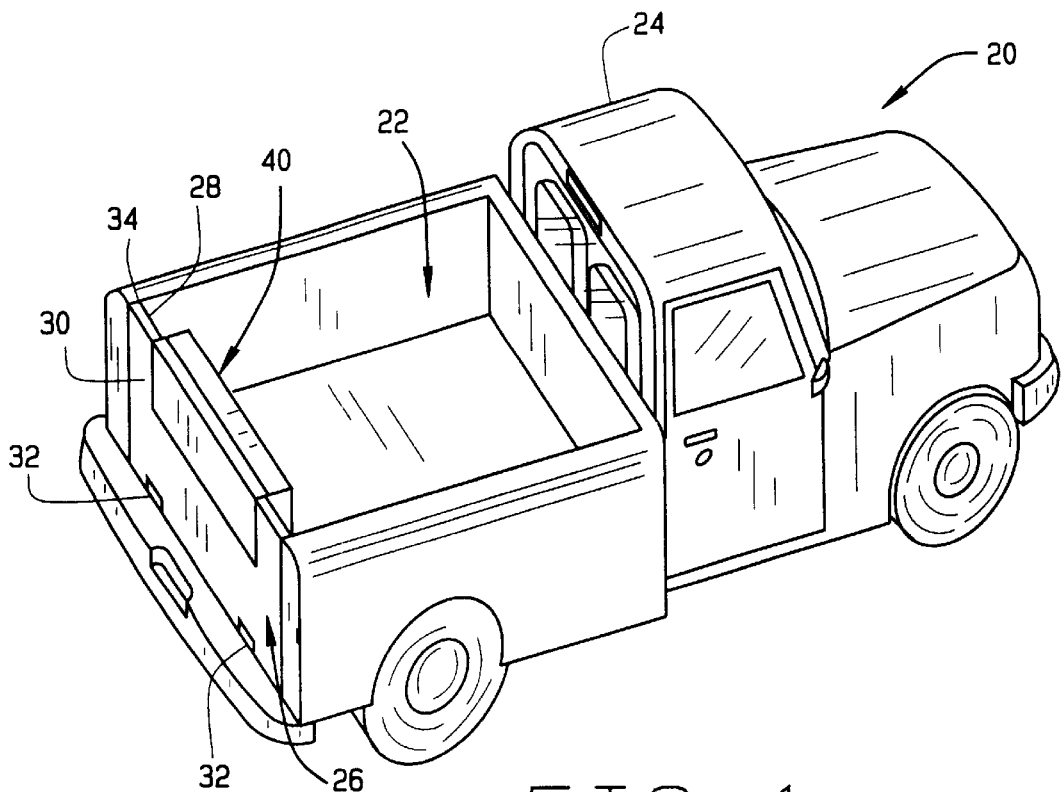
FIG. 1 is a perspective view of a pick-up truck provided with a workstation of the present invention.
Figure 2:
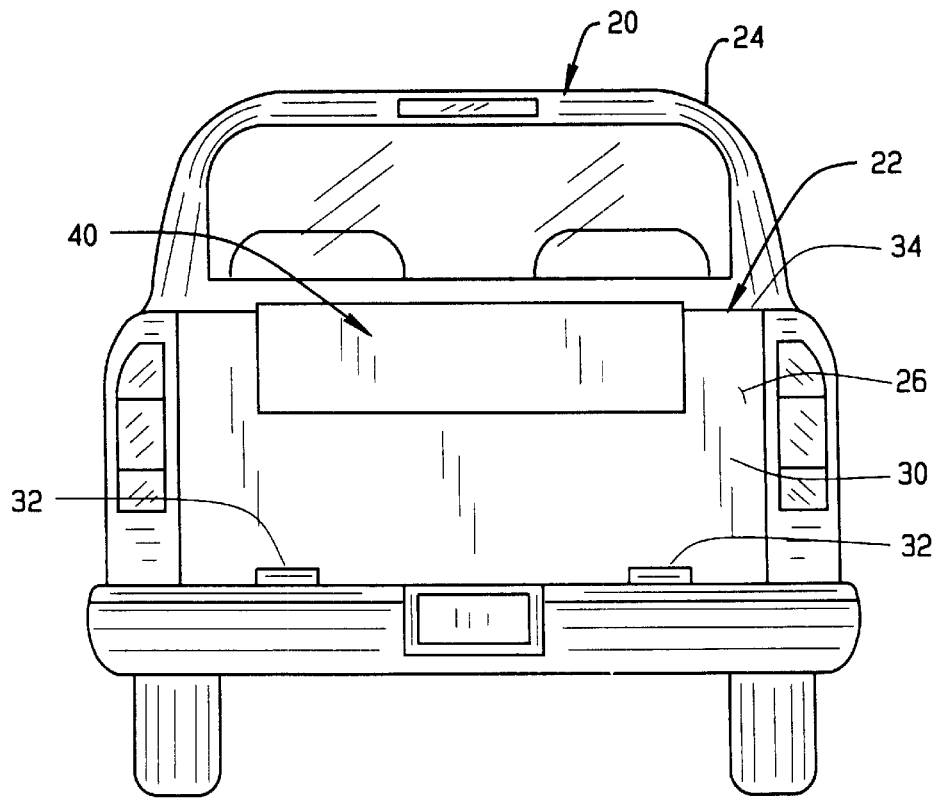
FIG. 2 is a rear elevational view of the pick-up truck of FIG. 1 with the workstation mounted on the tailgate.

FIG. 1 shows a general arrangement of a truck, generally indicated at reference character 20, with which a workstation of the present invention is used. The truck 20 has a bed 22 at the rear of a cab 24 of the truck 20. The bed 22 is enclosed on four sides with a tailgate 26 of the truck 20 forming the rearward most boundary of the truck bed 22. In the closed position as shown in FIGS. 1 and 2, the tailgate 26 is generally upright and latched to the frame of the truck 20 thereby forming the rear boundary for the bed 22. The tailgate 26 has opposite inner and outer surfaces 28, 30. The inner surface 28 faces generally forwardly and forms the interior boundary of the truck bed 22 when the tailgate 26 is in the upright position.

The truck tailgate 26 preferably has a hinge connection 32 at its lower bottom edge adjacent to the floor of the truck bed 22. Access to the truck bed 22 is obtained by pivoting the truck tailgate 26 about the hinge connection 30 to the tailgate open position, for example the orientation shown in FIGS. 3–5. In its open position, the tailgate 26 extends generally rearwardly outward from the bed 22 (i.e., from right to left as viewed in FIG. 3). In the open position, a distal end 34 of the tailgate opposite the hinged side of the tailgate 26 is spaced away from the bed 22 of the truck. Thus, in the open position of the tailgate 26, the tailgate inner surface 28 faces generally upwardly and the tailgate outer surface 30 faces generally downwardly.

A workstation of the present invention is generally indicated at reference character 40. As shown in the figures, the workstation 40 is preferably rectangularly shaped with an area that may be substantially the same size as the tailgate 26. However, the workstation 40 may be sized according to the needs of the user taking into account the size of the tailgate 26 and truck bed 22. Preferably, the workstation 40 is formed from sheet metal material. However, other sturdy materials may be used including polyethylene, PVC, or other plastics.

The workstation 40 comprises a first part 42 adapted to be mounted to the truck tailgate 26. Preferably, the first part 42 is mounted on the tailgate 26 of the truck in such a manner that a majority of the workstation 40 is arranged within the interior boundary of the bed 22 when the tailgate 26 is in the closed position. However, it should be understood that the position of the workstation 40 relative to the truck bed 22 may be changed so that a majority of the workstation is positioned on the exterior outer surface 30 of the tailgate 26. Preferably, the workstation first part 42 defines a tailgate-receiving channel 44 sized and shaped for receiving the tailgate 26. Preferably, the first part 42 is securely mounted to the tailgate 26 via suitable fasteners, such as screws or bolts. However, it should be understood that other means for attaching the first part to the tailgate may be used, including welding or adhesives. Additionally, it should be noted that the first part 42 may also be provided with a biasing member that urges against the tailgate to securely hold the first part to the tailgate. Also, a combination of any of the above methods may be used to mount the first part to the tailgate. As shown in the figures, the first part 42 is preferably shaped and sized for a snug fit of the tailgate 26 in the tailgate-receiving channel 44.

Figure 3:
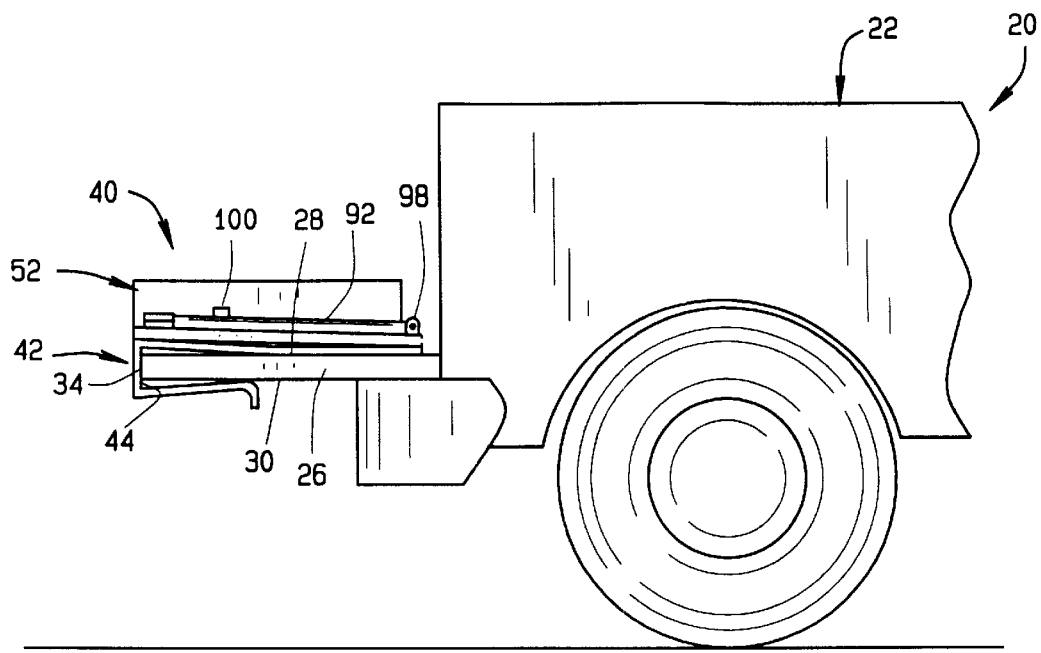
FIG. 3 is a partial side elevational view of the pick-up truck of FIG. 1 with the tailgate pivoted to its open position and the workstation in its closed position.
Figure 4:
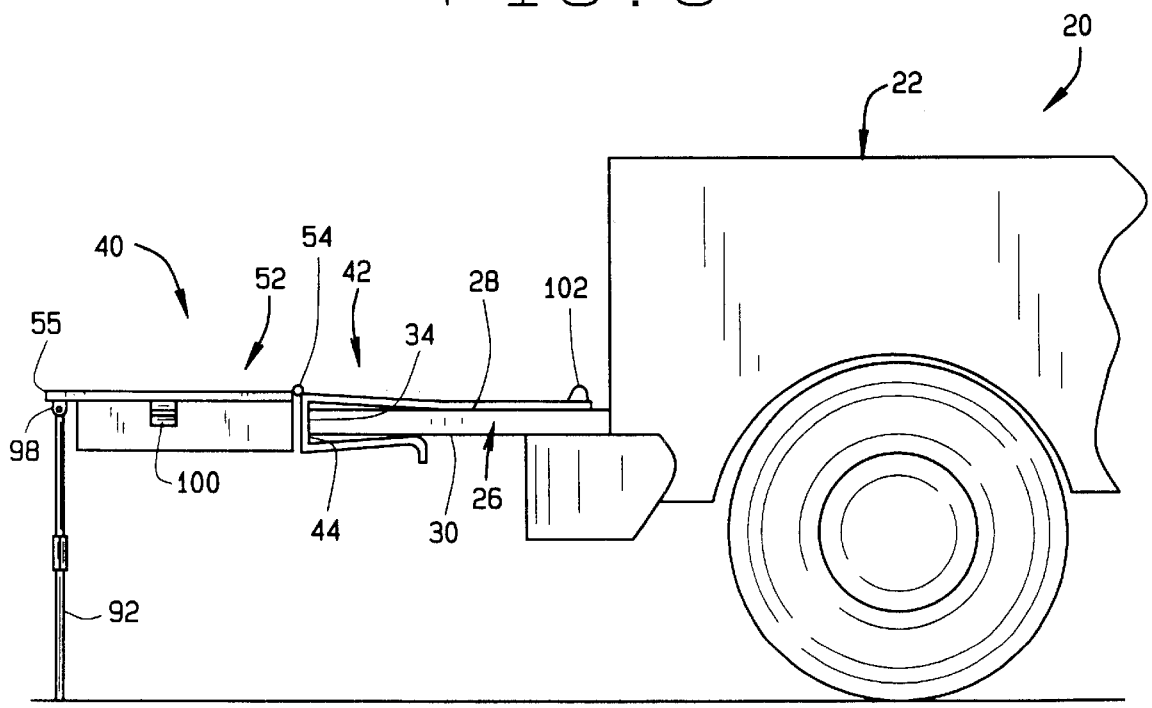
FIG. 4 is a partial side elevational view of the pick-up truck of FIG. 1 with the workstation arranged to support a work project.
Figure 5:
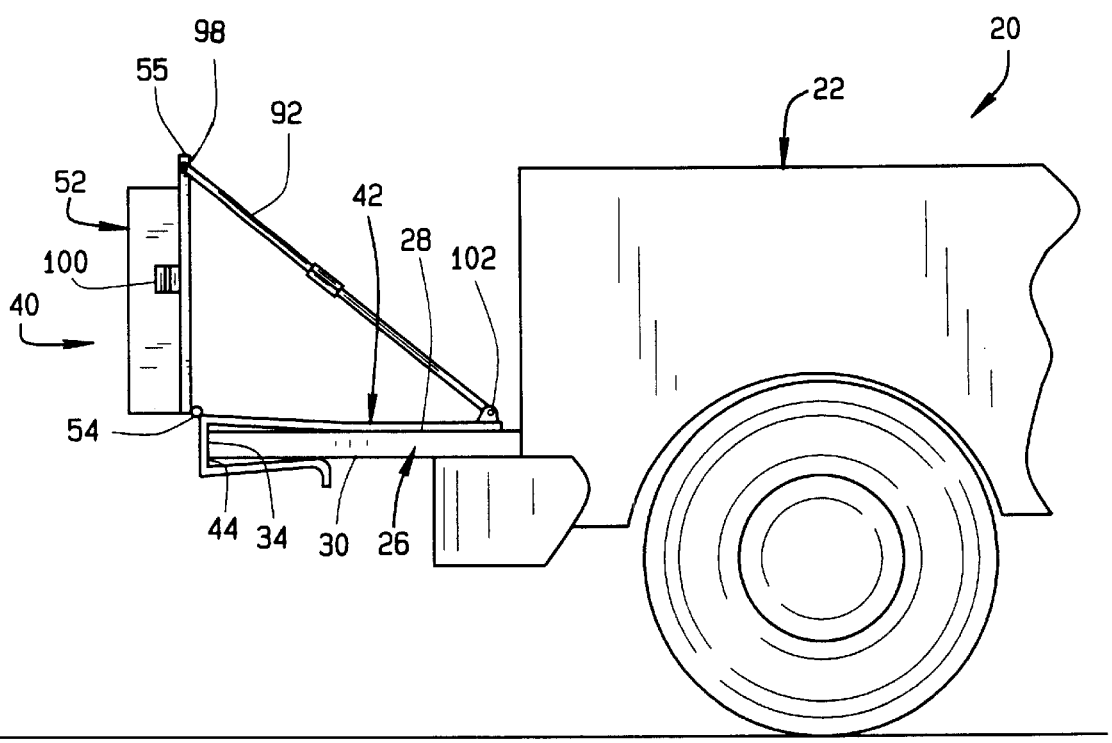
FIG. 5 is a partial side elevational view of the pick-up truck of FIG. 1 with the workstation arranged to extend an effective length of a bed of the pick-up truck.

The workstation 40 of the present invention also comprises a second part 52 hingedly connected to the first part 42. The hinge connection 54 may be a pin and barrel style hinge running continuously between the first and second parts 42,52. The hinge may also be formed as a reinforced fold line between the first and second parts depending upon the materials used to construct the workstation. The hinge connector 54 between the first and second parts 42,52 enables the second part 52 to pivot between open and closed positions of the second part relative to the first part 42. Preferably, the hinge connector 54 is on the tailgate distal end 34. When the second part 52 is in its closed position, the second part overlies the tailgate 26. As shown in FIG. 3, the second part 52 in the closed position is in a face-to-face arrangement with the first part 42 and the tailgate inner surface 28. In other words, the second part 52 is stacked against the first part 42, which is in turn stacked against the tailgate inner surface 28. In the open position, the second part 52 extends generally rearwardly from the tailgate 26. As shown in FIG. 4, the second part 52 in the open position is arranged laterally side-by-side the tailgate 26 and extends rearwardly from the tailgate 26 with a second part distal end 55 spaced away from the tailgate distal end 34.

The work station second part 52 comprises a body member 56. Preferably, a clamp area 58 of the body member 56 is provided extending around a peripheral edge of the body member. Preferably, the clamp area 58 is a structurally reinforced area of the body member 56 that forms a ledge around the body member. The clamp area 55 allows the user to employ a clamp or other fixturing device to the workstation 40 without causing damage to the second part 52 or body member 56. The clamp area 58 may extend around the body member 56 to the area of the hinge connector 54 between the first and second parts 42,52 to provide the workstation 40 with a reinforced area for the hinge connector. By arranging the clamp area 58 on the outer peripheral edge of the body member 56, the clamp area also protects the body member from damage from inadvertent contact with objects adjacent the workstation 40.

The body member 56 is preferably provided with at least one recess region 60. The recess 60 may be used as a storage compartment for tools and other implements that may be utilized by a user at a job site while working on a work project.

Preferably, the body member 56 is provided with a flap (or lid) 62 hingedly connected to the body member 56. The flap 62 is preferably movable relative to the body member 56 between first and second positions. In the first position, the flap 62 preferably covers the recess 60. In the second position, the flap 62 is preferably positioned away from the recess 60 to permit the user access to the recess 60. The flap 62 may be hingedly connected to the body member 56 as shown in the drawings with a pin and barrel style hinge 64. The hinge 64 may also be formed as a reinforced fold line between the flap 62 and body member 56 depending upon the materials used to construct the workstation 40. The flap may also be slidingly connected to the body member. In the hinge connection 64 arrangement shown in the figures, the flap 62 is preferably connected to the body member 56 with the hinge 64 placed in the clamp area 58 to provide better structural integrity for the hinge connection 64. As shown in the figures, it is preferred that the flap 62 open in such a manner as to provide unobstructed access to the recess 60 when the second part 52 is in the open position. For this purpose, the flap hinge 64 may be arranged adjacent the hinge connection 54 of the first and second parts 42,52. The flap may also be provided with a spring mechanism that urges the flap toward its closed position. The flap 62 is preferably provided with a lock 66 to releasably secure the flap 62 in its closed position. The lock 66 may be provided on an underside of the clamp area 58 at the distal end 55 of the second part or may be provided on a top surface of the flap 62 and/or clamp area 58. The flap 62 may include a handle or a finger well 68 to assist the user in operating the flap.

Preferably, the second part 52 forms a work surface 70. The work surface 70 faces generally upwardly when the second part 52 is in its open position and tailgate 28 is in its open position. The work surface 70 is adapted to support the work project thereon. Preferably, when the second part 52 is in the open position relative to the first part 42, the first part 42 is aligned substantially coplanar with the second part 52 such that the work surface 70 may extend between the first and second parts 42,52 of the workstation 40. As stated previously, the first part 42 may extend over a substantial area of the inner surface 28 of the tailgate. Thus, such a workstation 40 provides a relatively large work surface that is roughly twice the size of an area of the tailgate inner surface 28 for a wide variety of work projects.

Preferably, the flap 62 forms a portion of the work surface 70 when the flap is in its closed position. Preferably, the flap 62 is flush with the body member 56 when the flap is in the closed position so that the flap and body member form a substantially coplanar work surface. Additionally, it is preferred that the flap 52 mates flush with the clamp area 58 of the body member 56 when the flap is in the closed position so that the flap and clamp area form a substantially coplanar work surface.

Preferably, the workstation 40 comprises left and right sections 80,82. Each of the left and right sections 80,82 in effect comprises a workstation as previously described. Each section has its respective second part 52 independently hinged to its respective first part 42 and each is independently pivotable between open and closed positions as described previously. Accordingly, in the closed position of either of the sections 80,82, the section generally overlies the tailgate 26 In the open position of either of the sections 80,82 the section extends generally reerwardly from the tailgate 26. In this way, only one of the left and right sections 80,82 need be utilized at any one time depending upon the nature of the work project to be supported on the work surface 70. For instance, as shown in FIG. 6, when a small object is to be worked upon the work surface 70, only the left section 80 need be used. This permits moving the right section 82 to the closed position to allow access the bed 22 of the truck while leaving the left section 80 in the open position to allow the work project to be placed on the work surface 70 of the left section 80.

Preferably, each of the left and right sections 80,82 is provided with the recess region 60 in the body member 56. As described previously, the body member 56 is preferably provided with a clamp area 58 around the peripheral edge of the body member and recess region 60 within the clamp area. Preferably, each of the body members of the left and right sections 80,82 is provided with flap 62 hingedly connected to the body member. As stated previously, the flap 62 is preferably movable between the first position where the flap 62 covers the recess 60 and a second position in which the flap is positioned away from the recess to permit access to the recess.

A slide lock 90 is preferably provided between each of the left and right sections 80,82. By engaging the slide lock 90, the left and right sections 80,82 may be latched together and pivoted together as a unit when the second part 52 is pivoted from its closed to open position relative to the first part 42. By disengaging the slide lock 90, either of the left and right sections 80,82 may be pivoted independently of each other as desired.

The distal end 55 of the second part (or left and/or right sections) may be provided with an extension rod 92 or other suitable supporting means. The extension rod 92 is preferably attached to the underside of the clamp area 58 on the outer distal end 55 of each second part/section. The extension rod 92 extends between the distal end 55 of the second part/section and the ground 94 when the second part/section is in its open position and the first part 42 is mounted to the tailgate 26. Preferably, the extension rod 92 has an adjustable length to accommodate variation in the height of the tailgate 26 relative to the ground 94 and the ground condition. More preferably, the extension rod 92 is a telescoping member where a length of the telescoping member may be adjusted and fixed. In this way, the extension rod 92 acts as an adjustable column to stabilize and limit deflection of the work surface 70 when a load is applied to the work surface.

Preferably, the extension rod 92 is adapted to be moved to a stowed position when not in use and a deployed position when in use. As shown in the drawing figures, the extension rod 92 has a pivot point 98 located at its connection to the distal end of the second part (left and/or right section) 55. Accordingly, the extension rod 92 may be pivoted from a position parallel to the work surface 70 when in its stowed position to a position substantially perpendicular to the work surface 70 in its deployed position. Preferably, a clip 100 is provided on the underside of the clamp area to hold the extension rod in its stowed position.

The extension rod 92 enables the effective length of the bed 22 of the pick-up truck 20 to be extended. In the arrangement shown in FIG. 5, the work station second part 52 is pivoted to position intermediate the open and closed positions where the second part 52 is arranged perpendicularly to the first part 42 with the tailgate 26 in the open position. To secure the second part 52 in this orientation, the extension rod 92 is pivoted about its pivot point 98 and connected to a fastening mechanism 102 on the first part 42. The fastening mechanism 102 of the first part may comprise an eyelet wherein a mechanical fastener is directed through the eyelet and a hole in a distal end of the extension rod 92. By providing the extension rod 92 with an adjustable length, the angle of the second part 52 relative to the first part 42 may also be adjusted to an infinite number of angles as desired.

In operation, the tailgate 26 of the truck 20 may be moved to its open position. The work station second part 52 may be pivoted about its hinged connection to move the second part 52 to its open position relative to the first part 42. The extension rod 92 may be pivoted about its pivot point 98 to extend between the distal end of the second part/section 55 and the ground 94. Depending upon the distance between the distal end of the second part/section 55 and the ground 94, the length of the extension rod 92 may be adjusted as required. Depending upon the size of the work project to be performed on the work surface 70, one or both of the left and right sections 80,82 may be moved to its open position and its extension rod 92 employed to limit deflection of the work surface 70 when a load is placed on the work surface. When both left and right sections 80,82 are desired to be moved to the open position, the slide lock 90 may be engaged between the left and right sections 80,82 to allow the user to move both left and right sections 80,82 as a unit.

When performing work at the workstation 40, the flap 62 of the left and right sections 80,82 may be moved to its open position to permit access to the recess 60 of the body member 56 of the second part 52. Tools and other implements may be stored in the recess 60. When access to the recess 60 is obtained, the flap 62 may be returned to its closed position to reestablish the work surface 70 and provide a greater area for the work surface 70. When work is completed with one implement, the flap 62 may be opened and the tool returned to the recess 60 for storage. The finger well 68 assists the user in operating the flap 62 as the flap is preferably flush with the body member 56 and/or clamp area 58. The locking means 66 may be employed to safeguard items stored in the recess 60.

When the work project is complete, the extension rod 92 may be pivoted to its stowed position and the clip 100 engaged to hold the extension rod 92 in its moved position. If each of the left and right sections 80,82 is desired as a unit to the closed position, the slide lock 90 may be engaged so that both sections 80,82 may be pivoted together to the closed position. Once the second part 52 is returned to the closed position, the tailgate 26 may be moved to its closed position and latched to the truck frame.

In view of the above, it will be seen that several objects of the invention are achieved and other advantageous results obtained. As various changes could be made in the above constructions and methods without departing from the scope of the invention, it is intended that all matter contained in the above description or shown in the accompanying drawings shall be interpreted as illustrative and not in any limiting sense.

What is claimed is:

1. A work station for use with a tailgate of a truck, the tailgate being pivotable between a generally closed position and an open position, the tailgate being generally upright when in its closed position, the tailgate extending generally rearwardly when in its open position, the tailgate having an inner surface, the inner surface facing generally upwardly when the tailgate is in its open position, the work station comprising:

a first part adapted to be mounted to the tailgate of the truck; and a second part being hingedly connected to the first part to pivot between an open position and a closed position, the second part generally overlying the tailgate when the second part is in its closed position and the first part is mounted to the tailgate, the second part extending generally rearwardly from the tailgate when the second part and tailgate are in their respective open positions and the first part is mounted to the tailgate.

2. The workstation of claim 1 wherein the second part comprises a work surface, the work surface facing generally upwardly when the second part and tailgate are in their respective open positions and the first part is mounted to the tailgate.

3. The workstation of claim 2 wherein the second part further comprises a body member defining at least one recess region and a flap hingedly connected to the body member, the flap being movable between a first position in which the flap covers the recess and a second position in which the flap is positioned away from the recess to permit access to the recess.

4. The workstation of claim 3 wherein the flap and the body member comprise portions of the work surface.

5. The workstation of claim 2 further comprising a means for supporting the second part.

6. The work station of claim 5 wherein:
the second part is adapted to be pivoted to a position intermediate the open and closed positions of the second part relative to the first part where the second part work surface forms an interior boundary of a bed of the truck thereby extending an effective length of the truck bed when the first part is mounted to the tailgate; and
the support means extends between the first and second parts to secure the second part in the intermediate position.

7. The workstation of claim 2 wherein the first part substantially covers the inner surface of the tailgate when the first part is mounted to the tailgate.

8. The workstation of claim 7 wherein the first part comprises a work surface, the work surface of the first part being generally co-planar with the work surface of the second part when the second part and tailgate are in their respective open positions and the first part is mounted to the tailgate.

9. The workstation of claim 2 further comprising left and right sections arranged side-by-side each other on the tailgate, each of the left and right sections having its second part independently hinged to its first part and independently pivotable between open and closed positions, each section generally overlies the tailgate when the section is in its closed position and the first part is mounted to the tailgate, each section extends generally rearwardly from the tailgate when the section and tailgate are in their respective open positions and the first part is mounted to the tailgate.

10. The work station of claim 9 wherein each of the left and right section further comprises a body member defining at least one recess region and a flap hingedly connected to the body member, the flap being movable between a first position in which the flap covers the recess and a second position in which the flap is positioned away from the recess to permit access to the recess.

11. A combination comprising:
a truck comprising a tailgate being pivotable between a generally closed position and an open position, the tailgate being generally upright when in its closed position, the tailgate extending generally rearwardly when in its open position, the tailgate having an inner surface, the inner surface facing generally upwardly when the tailgate is in its open position; and
a workstation comprising a first part adapted to be mounted to the tailgate of the truck and a second part being hingedly connected to the first part to pivot between an open position and a closed position, the second part generally overlying the tailgate when the second part is in its closed position and the first part is mounted to the tailgate, the second part extending generally rearwardly from the tailgate when the second part and the tailgate are in their respective open positions and the first part is mounted to the tailgate.

12. A method comprising:
providing a truck comprising a tailgate that is pivotable between a generally closed position and an open position, the tailgate being generally upright when in its closed position, the tailgate extending generally rear- wardly when in its open position, the tailgate having an inner surface, the inner surface facing generally upwardly when the tailgate is in its open position;
providing a work station comprising a first part adapted to be mounted to the tailgate of the truck, the work station further comprising a second part hingedly connected to the first part to pivot between an open position and a closed position, the second part generally overlying the tailgate when the second part is in its closed position and the first part is mounted to the tailgate, the second part extending generally rearwardly from the tailgate when the second part and tailgate are in their respective open positions and the first part is mounted to the tailgate;
attaching the work station to the tailgate of the truck;
pivoting the tailgate to its open position;
pivoting the workstation second part to the open position; and
placing a work project on a work surface of the worksta- tion.

13. The method of claim 12 wherein the step of providing the work station further comprises providing the workstation second part with a body member defining at least one recess region and a flap hingedly connected to the body member, the flap being movable between a first position in which the flap covers the recess and a second position in which the flap is positioned away from the recess to permit access to the recess; and
the method further comprising moving the flap between its open and closed positions.

14. The method of claim 13 further comprising placing work tools in the at least one recess.

15. The method of claim 12 wherein the step of providing the work station further comprises providing the workstation second part with a support means;
the method further comprising employing the support means before the work project is placed on the work surface.

16. The method of claim 12 wherein the step of providing a workstation further comprises providing left and right sections arranged side-by-side each other on the tailgate, each of the left and right sections having its second part independently hinged to the first part and independently pivotable between open and closed positions, each section generally overlies the tailgate when the section is in its closed position and the first part is mounted to the tailgate, each section extends generally rearwardly from the tailgate when the section and tailgate are in their respective open positions and the first part is mounted to the tailgate; and
the step of pivoting the second part comprises pivoting one of the left and right sections to its respective open position.

17. The method of claim 16 wherein the step of pivoting the second part further comprises pivoting the other one of the left and right sections to its respective open position.

18. The method of claim 16 wherein the step of providing the work station further comprises providing at least one of the left and right sections with a body member defining at least one recess region and a flap hingedly connected to the body member, the flap being movable between a first posi- tion in which the flap covers the recess and a second position in which the flap is positioned away from the recess to permit access to the recess; and
the method further comprising moving the flap between its open and closed positions.

19. The method of claim 18 further comprising placing work tools in the at least one recess.

* * * * *